United States Patent
Chung et al.

(10) Patent No.: US 6,678,233 B2
(45) Date of Patent: Jan. 13, 2004

(54) OBJECTIVE LENS AND OPTICAL PICKUP DEVICE USING THE SAME

(75) Inventors: Chong-sam Chung, Seongnam (KR); Tae-kyung Kim, Suwon (KR); Young-man Ahn, Suwon (KR); Hea-jung Suh, Seongnam (KR)

(73) Assignee: Samsung Electronics Co., Ltd., Suwon (KR)

( * ) Notice: Subject to any disclaimer, the term of this patent is extended or adjusted under 35 U.S.C. 154(b) by 378 days.

(21) Appl. No.: 09/794,079

(22) Filed: Feb. 28, 2001

(65) Prior Publication Data

US 2001/0050893 A1 Dec. 13, 2001

(30) Foreign Application Priority Data

Apr. 17, 2000 (KR) .......................................... 2000-20069

(51) Int. Cl.[7] .................................................. G11B 7/00
(52) U.S. Cl. ..................................... 369/112.08; 369/94
(58) Field of Search ........................... 369/44.23, 44.37, 369/44.27, 112.03, 112.08, 112.07, 112.1, 112.12, 112.13, 112.15, 112.23, 112.24, 94

(56) References Cited

U.S. PATENT DOCUMENTS

| | | | |
|---|---|---|---|
| 5,446,565 A | | 8/1995 | Komma et al. |
| 5,644,413 A | * | 7/1997 | Komma et al. ........ 369/44.23 |
| 5,703,856 A | | 12/1997 | Hayashi et al. |
| 5,838,496 A | * | 11/1998 | Maruyama et al. ........ 359/565 |
| 6,118,597 A | * | 9/2000 | Maruyama ........ 359/743 |
| 6,191,889 B1 | * | 2/2001 | Maruyama ........ 359/566 |
| 6,201,780 B1 | * | 3/2001 | Katayama ........ 369/94 |
| 6,304,540 B1 | * | 10/2001 | Yoo et al. ........ 369/44.23 |
| 6,392,977 B2 | * | 5/2002 | Ando et al. ........ 369/94 |

FOREIGN PATENT DOCUMENTS

| | | |
|---|---|---|
| JP | 9-306018 | 11/1997 |
| JP | 10-10308 | 1/1998 |
| JP | 11-16194 | 1/1999 |
| JP | 11-110806 | 4/1999 |
| JP | 11-287948 | 10/1999 |
| JP | 11-328719 | 11/1999 |
| JP | 2000-81566 | 3/2000 |
| JP | 2000-90477 | 3/2000 |

* cited by examiner

*Primary Examiner*—Thang V. Tran
(74) *Attorney, Agent, or Firm*—Staas & Halsey LLP

(57) ABSTRACT

An objective lens includes an aspherical lens facing a disk and having a predetermined first focal distance and a predetermined numerical aperture, and a holographic lens installed adjacent to the aspherical lens and having a second focal distance longer than that of the first focal distance and having a diffraction lattice to compensate for the chromatism due to a change in wavelength of laser light having a wavelength of 670 nm or less. Thus, during the shift between recoding and reproduction of a DVD or an HD-DVD, the change in wavelength due to the change in power of the laser light and chromatism according to the change can be effectively corrected. Also, since the objective lens is formed of one aspherical lens and one holographic lens, the material for each of the lenses can be easily selected and also the structure of the optical pickup using the objective lens according to the present invention can be simplified.

39 Claims, 7 Drawing Sheets

OBJECTIVE LENS AND OPTICAL PICKUP DEVICE USING THE SAME

CROSS-REFERENCE TO RELATED APPLICATIONS

This application claims the benefit of Korean Application No. 00-20069, filed Apr. 17, 2000, in the Korean Industrial Property Office, the disclosure of which is incorporated herein by reference.

BACKGROUND OF THE INVENTION

1. Field of the Invention

The present invention relates to an objective lens and an optical pickup device using the same, and more particularly, to an objective lens which effectively compensates for the chromatism generated at an objective lens due to a change in the output of a light source when a mode is shifted, and to an optical pickup device using the same.

2. Description of the Related Art

As the storage capacity of optical storage devices increases, the quality of reproduced signals becomes more affected by reproduction conditions. In the case of an optical pickup using a blue laser light source having a short wavelength, the reproduced signal deteriorates due to chromatism generated from an objective lens.

In general, for the glass and plastic materials used to make an objective lens of an optical pickup device, as a wavelength of a light source decreases, the refractive index thereof increases. Also, the rate of change in the refractive index with respect to the change in wavelength increases as the wavelengths decrease so that the amount of chromatism generated corresponding to the amount of change in the wavelength increases. The objective lens used for an optical pickup device of an optical storage device is usually of an aspherical mono lens type formed of plastic or glass. In an optical pickup device using a blue laser light source of 400 nm, the deterioration in quality of a reproduced signal caused by chromatism due to a change in the wavelength of a laser light source is unavoidable.

FIG. 1 is a graph showing the change in the refractive index due to a change in the wavelength for each type of lens material. Referring to the drawing, it can be seen that, as the wavelength becomes shorter, the refractive index for each material changes rapidly. The change in the refractive index due to a change in the wavelength greatly affects the performance of an objective lens used for an optical storage device. Chromatism due to a change in the oscillation wavelength of laser light changes the working distance between an objective lens and a disk, which means that the chromatism due to the change in wavelength can be compensated for.

In the case of an optical storage device capable of reproduction and recording, the power of the laser light used for reproduction and recording varies. The change in power causes changes in wavelength of about ±2 nm with respect to a reference wavelength of laser light. Accordingly, chromatism due to the change in the wavelength is generated at an objective lens designed for the reference wavelength. Such chromatism can be compensated for by adjusting the working distance between the objective lens and the disk. Adjustment of the working distance is performed in a process in which a reproduced signal is made optimal by a focus servo mechanism. However, after the chromatism is generated, since a duration on the order of about tens of microseconds is required for operating a circuit of the focus servo mechanism, the quality of a signal reproduced or recorded for the above time deteriorates.

Thus, in a reproducing and recording optical storage device, an objective lens is needed which can reduce or compensate for the generation of chromatism when the wavelength of laser light changes in a range of at least ±2 nm due to a shift in mode.

FIG. 2 shows the structure of a single objective lens 2 used in a conventional optical pickup device for an optical storage device. FIG. 3 shows the property of chromatism for selected wavelengths of an objective lens in a state in which the working distance between the objective lens and the disk is fixed. Here, it is assumed that the objective lens is for a DVD (digital versatile disc) and has a structure having a reference wavelength of 650 nm and an NA (numerical aperture) of 0.6. As can be seen from FIG. 3, even when the wavelength changes by ±2 nm with respect to the reference wavelength of 650 nm, since the RMS (root means square) chromatism is less than or equal to 0.04 λ without adjustment of focus, no special problem is created in the performance of the optical pickup device.

Table 1 shows data of each of surfaces of the disk 1 and objective lens 2. Table 2 shows the amount of defocus and the wave front chromatism for each wavelength.

TABLE 1

| Focal Distance | 3.32 mm | | |
|---|---|---|---|
| Surface Number | Curvature | Thickness | Material |
| 1 | 2.146 | 1.98 | BACD5 |
| | | Conic Constant (K): 1 | |
| | | Aspherical Coefficient | |
| | A: 0.693347E-2 | B: 0.406563E-3 | |
| | C: 0.36161E-4 | D: 0.25357E-5 | |
| 2 | 13.826 | 1.0 | |
| | | Conic Constant(K): 0 | |
| | | Aspherical Coefficient | |
| | A: 0.11646E-1 | B: 0.21165E-2 | |
| | C: 0.20695E-3 | D: 0.72947E-5 | |
| 3 | Infinity | 0.6 | Disc |
| 4 | Infinity | 0.089 | |
| 5 | Infinity | 0.0 | |

TABLE 2

| Wavelength (nm) | 652 | 650 | 648 |
|---|---|---|---|
| Defocus ($\mu$m) | 0.3 | 0.0 | 0.3 |
| Wave Front Chromatism ($\lambda$) | 0.001 | 0.0004 | 0.0005 |

The amount of defocus in Table 2 is the amount of distance changed adjusted from (3.32 mm) in Table 1 so that the distance between the objective lens 2 and the minimum wave front chromatism.

FIG. 4 shows a property of chromatism for each wavelength with respect to an objective lens 2 designed under the conditions of the wavelength being 405 nm and the NA being 0.6. As shown in FIG. 4, in a reference wavelength of 405 nm, a mere change of about ±2 nm increases the RMS wave front chromatism over 0.1λ. As a result, such a wave front chromatism shows that the objective lens 2 cannot be applied to an optical pickup of an optical storage device. Data of each surface according to the above optical design is shown in Table 3 below. Table 4 shows the amount of defocus and wave front chromatism for each wavelength.

TABLE 3

| Focal Distance Surface Number | 3.32 mm Curvature | Thickness | Material |
|---|---|---|---|
| 1 | 2.108 | 1.78 | BACD5 |
| | Conic Constant (K); 1.0 | | |
| | Aspherical Coefficient | | |
| | A: 0.70644E-2 | B: 0.37055E-3 | |
| | C: 0.65144E-4 | D; 0.21579E-4 | |
| 2 | 16.349 | 1.0 | |
| | Conic Constant(K): 0 | | |
| | Aspherical Coefficient | | |
| | A: 0.91856E-1 | B; 0.16114E-2 | |
| | C: 0.19349E-3 | D: 0.161417E-4 | |
| 3 | Infinity | 0.6 | Disc |
| 4 | Infinity | 0.813 | |
| 5 | Infinity | 0.0 | |

TABLE 4

| Wavelength (nm) | 407 | 405 | 403 |
|---|---|---|---|
| Defocus (μm) | 1.82 | 048 | 0.87 |
| Wave Front Chromatism (λ) | 0.006 | 0.0025 | 0.0018 |

As a widely used method for compensating for the chromatism due to the change in wavelength as above, a conventional objective lens 2 is made by assembling two aspherical lenses formed of different materials. However, it is difficult to manufacture an objective lens 2 by injection molding each of the two aspherical lenses and combining the two units. In particular, when chromatism is to be corrected by using two aspherical lenses, a low-distribution lens having a positive power and a high-distribution lens having a negative power are manufactured respectively using flint-based glass and crown-based glass as materials. Then, the respective lenses are combined or coupled with a particular air gap. However, in the conventional objective lens 2, since the respective aspherical lenses must have a distribution of over 30, the kinds of lens material to be injection molded are quite limited so that it is difficult to choose a material for each of the lenses. The term distribution refers to the variation of the refractive index of an optical material with respect to changes in wavelength.

SUMMARY OF THE INVENTION

To solve the above problems, it is an object of the present invention to provide an optical pickup device which can be easily manufactured and assembled and in which chromatism due to a change in wavelength can be corrected.

It is another object of the present invention to provide an optical pickup device in which the material of a lens for correcting chromatism due to a change in wavelength can be easily chosen.

Additional objects and advantages of the invention will be set forth in part in the description which follows and, in part, will be obvious from the description, or may be learned by practice of the invention.

Accordingly, there is provided an objective lens comprising an aspherical lens facing a disk and having a predetermined first focal distance and a predetermined numerical aperture, and a holographic lens installed adjacent to the aspherical lens having a second focal distance longer than that of the first focal distance and having a diffraction lattice to compensate for the chromatism due to a change in wavelength of laser light having a wavelength of 670 nm or less.

Also, there is provided an optical pickup device comprising a light source to generate a laser light to a disk, an objective lens including an aspherical lens facing a disk and having a predetermined first focal distance and a predetermined numerical aperture, and a holographic lens installed adjacent to the aspherical lens having a second focal distance longer than that of the first focal distance and having a diffraction lattice to compensate for the chromatism due to a change in wavelength of laser light having a wavelength of 670 nm or less, a beam splitter provided between the light source and the objective lens, and a photodetector to receive light reflected by the disk and having passed through the beam splitter.

Further, there is provided an optical pickup device comprising first and second light sources to generate laser lights having different wavelengths to a respective one of two different kinds of disks, an objective lens including an aspherical lens facing a disk and having a predetermined first focal distance and a predetermined numerical aperture, and a holographic lens installed adjacent to the aspherical lens and having a second focal distance longer than that of the first focal distance and having a diffraction lattice to compensate for the chromatism due to a change in wavelength of laser light having a wavelength of 670 nm or less, a first beam splitter provided between the first light source and the objective lens to pass the laser light emitted from the first and second light sources to the disk, a second beam splitter provided between the first beam splitter and the first light source to pass the laser light emitted from the second light source to the disk, and a photodetector to receive light reflected by the disk and passing through the first beam splitter.

There is further provided an optical pickup device in which the disk is one of a disk type including a DVD and an HD-DVD.

There is still further provided an optical pickup device in which the aspherical lens has a positive power and the holographic lens has either a positive or a negative power.

Also, it is preferred in the present invention that the aspherical lens has positive power and the holographic lens is positive or negative power.

BRIEF DESCRIPTION OF THE DRAWINGS

The above objects and advantages of the present invention will become more apparent by describing in detail preferred embodiments thereof with reference to the attached drawings in which.

DESCRIPTION OF THE PREFERRED EMBODIMENTS

Figure 1:
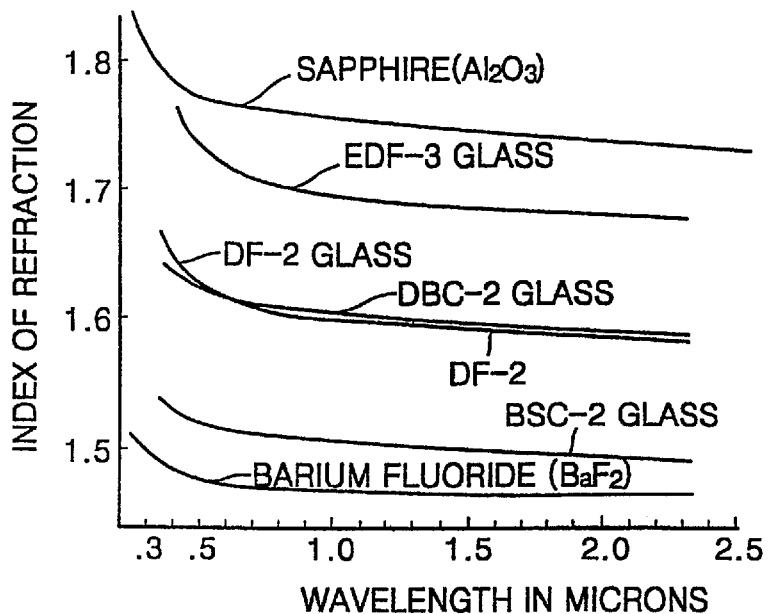
FIG. 1 is a graph showing a change in the refractive index according to a change in wavelength for lens materials generally used.
Figure 2:
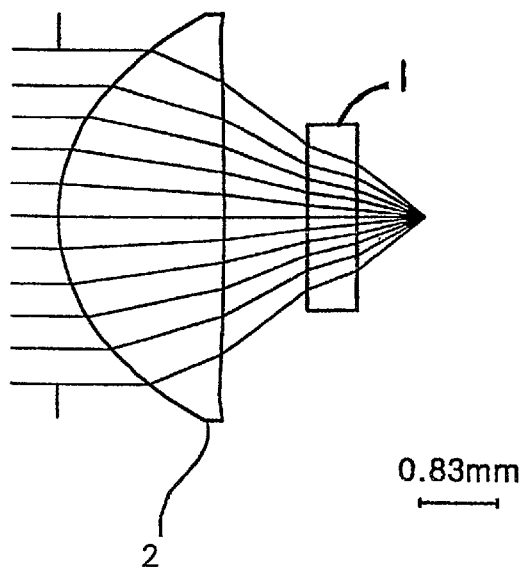
FIG. 2 shows a single objective lens applied to a conventional optical pickup device for an optical storage device.
Figure 3:
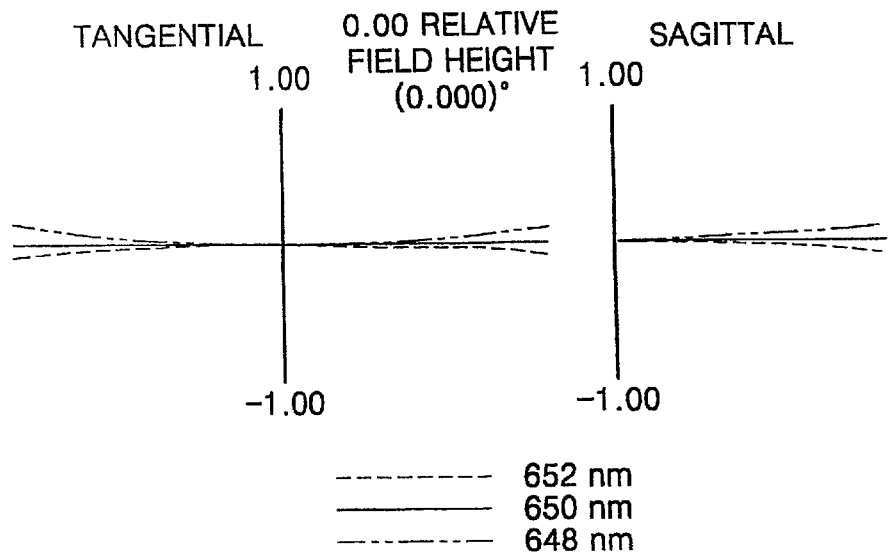
FIG. 3 is a graph showing the property of chromatism for each wavelength of the objective lens in a state in which a working distance between the conventional objective lens and the disk is fixed.
Figure 4:
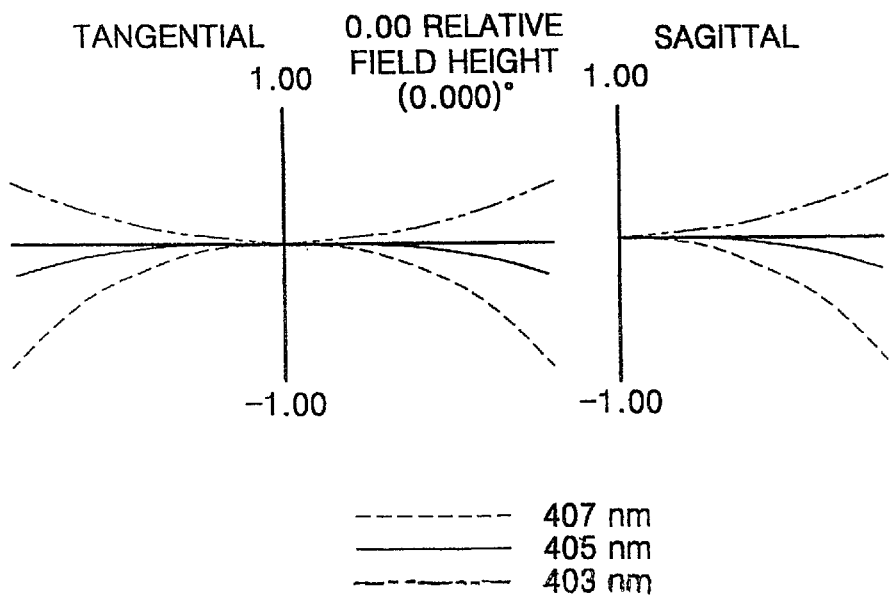
FIG. 4 is a graph showing the property of chromatism for each wavelength with respect to the conventional objective lens designed under the conditions of the wavelength being 405 nm and the NA being 0.6.

Reference will now be made in detail to the present preferred embodiments of the present invention, examples of which are illustrated in the accompanying drawings, wherein like reference numerals refer to the like elements throughout. The embodiments are described below in order to explain the present invention by referring to the figures.

Figure 5:
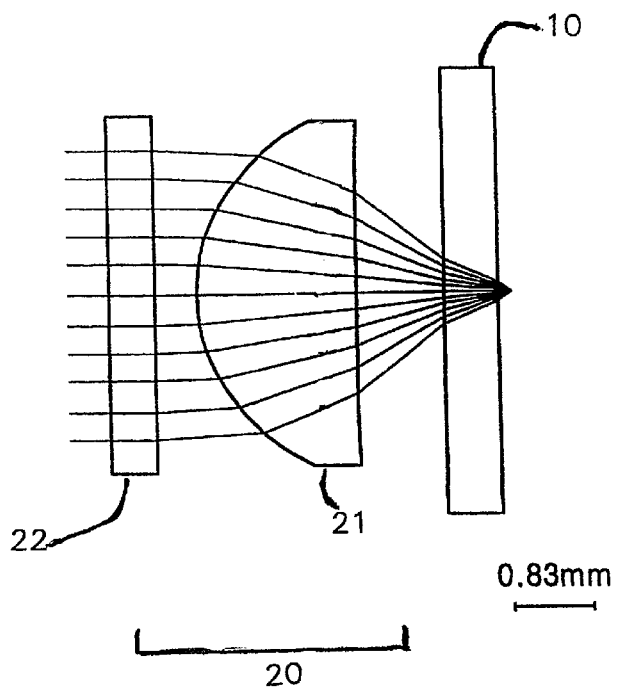
FIG. 5 shows an objective lens according to an embodiment of the present invention.

According to an embodiment of the present invention shown in FIG. 5, an objective lens 20 comprises one aspherical lens 21 and one holographic lens 22. In the objective lens according to the present invention, the holographic lens 22 has a negative distribution of −3.5 and the aspherical lens 21 is formed of glass material having a distribution of 60 such as BACD5 of HOYA, a Japanese lens manufacturing company.

The materials of these lenses of the objective lens 20 of the present invention can be easily selected and can effectively correct chromatism of laser light having a short wavelength of 670 nm or less, in particular around 400 nm.

Figure 6:
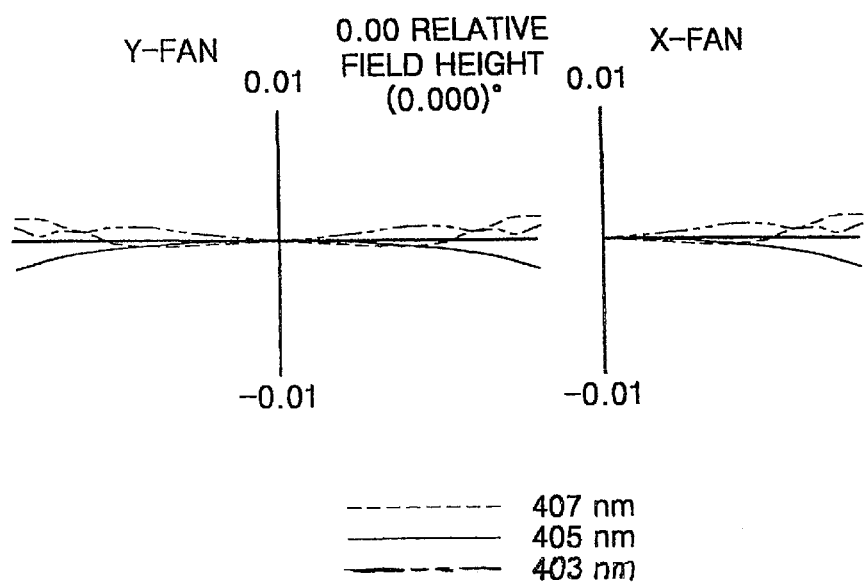
FIG. 6 is a graph showing the property of chromatism of the objective lens according to the present invention shown in FIG. 5.

The optical data of each side of the respective optical parts and the holographic lens 22 in the present objective lens 20 in FIG. 5 is set forth in Table 5. FIG. 6 shows the property of the objective lens 20 using an aspherical lens 21 having a positive power and a holographic lens 22 having a positive or negative power. Table 5 is based on the optical design standard in which a reference wavelength λ is 405 nm and NA is 0.6.

TABLE 5

| Focal Distance | Holographic Lens: 34.5 mm Aspherical Lens: 2.74 mm | | |
|---|---|---|---|
| Surface Number | Curvature | Thickness | Material |
| 1 | Infinity | 0.5 | BK7 |
| 2 | Infinity | 0.5 | |
| | Data of Holographic Lens | | |
| 3 | C3: −1.4493E−1  C5: −1.4493E−2  2.108 | 1.78 | BACD5 |
| | Conic Constant (K): −1.0 Aspherical Coefficient: | | |
| | A: 0.70644E−2  B: 0.37055E−3  C: 0.65114E−4  D: −0.21579E−4  E: 0.59665E−5  F: −0.70753E−6 | | |
| 4 | −16.349 | 1.0 | |
| | Conic Constant (K): 0 Aspherical Coefficient: | | |
| | A: 0.91856E−2  B: −0.16114E−2  C: 0.19349E−3  D: −0.161417E−4 | | |
| 5 | Infinity | 0.6 | Disc |
| 6 | Infinity | 0.813 | |
| 7 | Infinity | 0.0 | |

Table 6 below shows the amount of defocus and the surface chromatism of the objective lens 20 according to Table 5.

TABLE 6

| Wavelength (nm) | 407 | 405 | 403 |
|---|---|---|---|
| Defocus (μm) | 0.02 | 0.0 | 0.16 |
| Wave Surface Chromatism (λ) | 0.006 | 0.0025 | 0.008 |

The definition of the optical coefficient of the holographic lens is expressed by Equation 1 in which the change in phase of a wave surface in a rectilinear coordinate system (X and Y) having the center of a holographic surface as the origin.

$$\phi(X, Y) = \frac{2\pi}{\lambda} \sum_m \sum_n C_N X^m Y^n \quad (1)$$

where N=0.5 ((m+n)²+m+3n) with N being a constant, and m and n being integers.

The amount of defocus of the objective lens 20 should be within a range of focus depth (Fd) of the objective lens 20 which is the amount of defocus allowed in optical storage devices.

When the objective lens 20 has an NA of 0.6 and a wavelength of 405 nm, the focal depth is 0.56 μm and, as shown in Table 6, a superior wave front chromatism of less than 0.01 λ with respect to a change in wavelength of ±2 nm within the focal depth is obtained.

$$Fd = \frac{\lambda}{2NA^2} \quad (2)$$

As described above, since the objective lens 20 has a wave front chromatism of less than 0.01 λ with respect to a change in wavelength of ±2 nm, it is appropriate for an optical pickup device to use with a laser light having a wavelength of about 400 nm.

Figure 7:
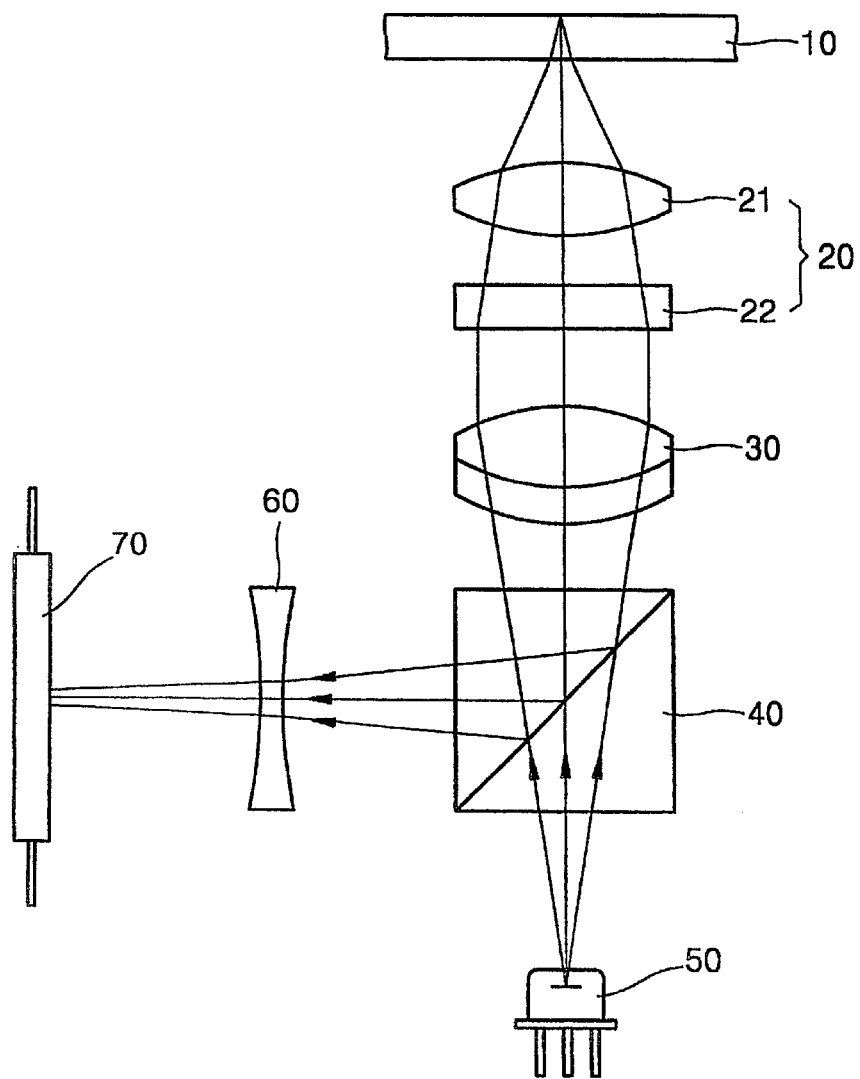
FIG. 7 shows an optical pickup device using the objective lens according to an embodiment of the present invention.

An optical pickup device adopting the objective lens according to an embodiment of the present invention is shown in FIG. 7. Referring to FIG. 7, an objective lens 20 according to the present invention is disposed close to a disk 10. A collimating lens 30 and a beam splitter 40 are disposed on the optical axis between the objective lens 20 and a light source 50. A light receiving portion lens 60 and a photodetector 70 are disposed on the optical axis of light reflected by the beam splitter 40.

Here, the objective lens 20 has an aspherical lens 21, a holographic lens 22, and the optical structure as set forth in Table 5. The optical pickup device having the above structure may be for a disk type, for example, a DVD or a HD-DVD (high definition DVD) which is currently being developed. However, except for a special case, the optical pickup device may not be as effective when used in an optical pickup device for a CD in which laser light having a wavelength of 780 nm is used.

The laser light for DVDs has a wavelength of 650 nm whereas the laser light for HD-DVDs has a relatively shorter wavelength of around 400 nm. Accordingly, the light source 50 of the optical pickup device of the present invention generates laser light having a wavelength corresponding to the type of disk 10 and optical properties of the beam splitter 40 and the collimating lens 30 should appropriately correspond to the above wavelength.

The objective lens 20 according to the present invention and the optical pickup device adopting the same are preferably applied for DVDs or HD-DVDs. Furthermore, the structures thereof are preferably designed to be compatible with both DVDs and HD-DVDs. However, it is understood that other types of disks can be used with the optical pickup adjusted accordingly.

Figure 8:
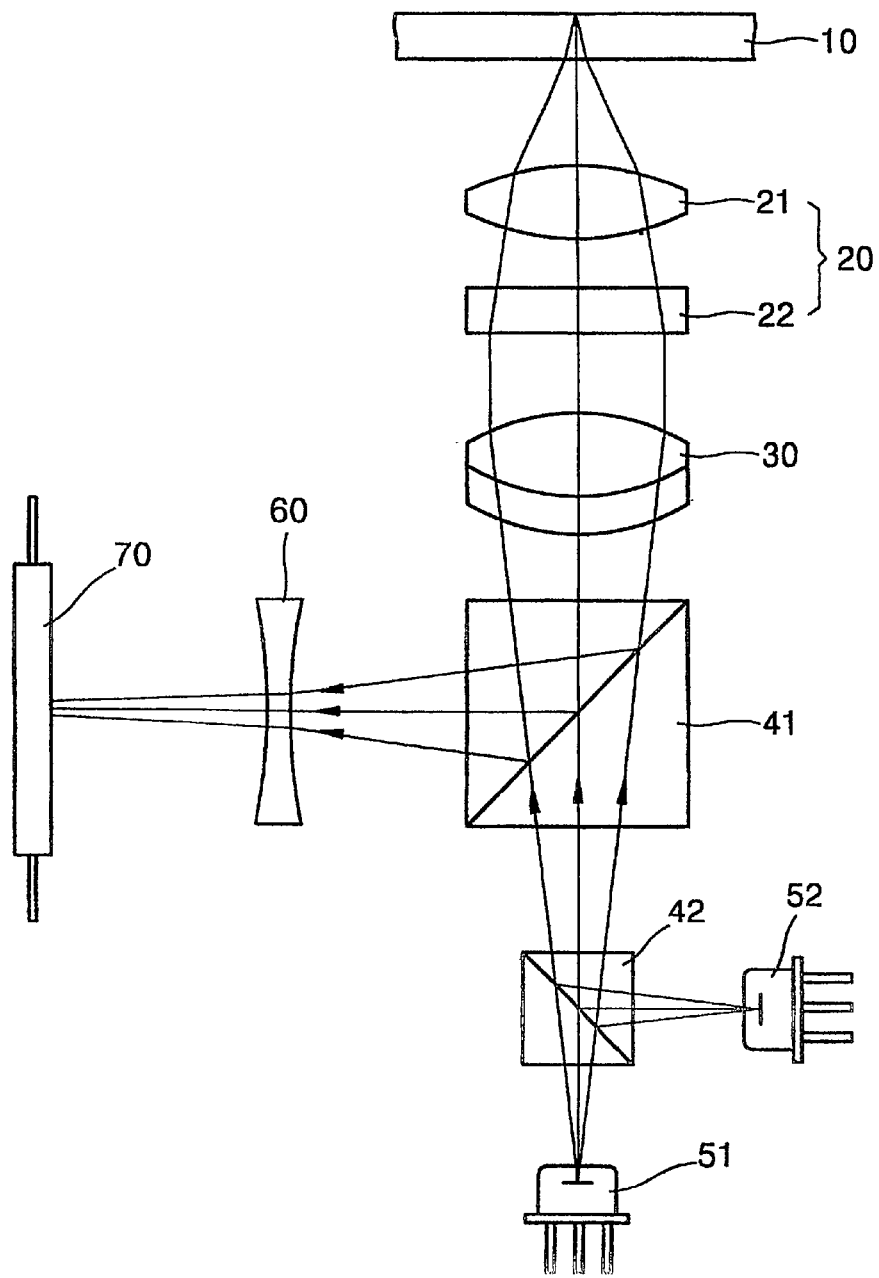
FIG. 8 shows an optical pickup device using the objective lens according to another embodiment of the present invention.

FIG. 8 shows an optical pickup device according to the present invention having a structure compatible with two types of disks, for example, DVDs and HD-DVDs. Referring to the drawing, an objective lens 20 is disposed close to a disk 10. A collimating lens 30, a first beam splitter 41 and a second beam splitter 42 are disposed on the linear optical axis between the objective lens 30 and the first light source 51. A light receiving portion lens 60 and a photodetector 70 are disposed on the optical axis of light reflected by the first beam splitter 41. A second light source 52 for emitting laser light to the disk 10 via the second beam splitter 42 is disposed at one side of the second beam splitter 42.

The first beam splitter 41 transmits the laser light emitted from the first and second light sources 51 and 52 toward the objective lens 60 and reflects the laser light reflected by the disk 10 toward the photoreceptor 70 through the light receiving portion lens 60.

The second beam splitter 42 transmits the laser light emitted from the first light source 51 toward the first beam splitter 41, and reflects the laser light emitted from the second light source 52 toward the first beam splitter 41.

The first light source 51 oscillates laser light having a wavelength corresponding to an HD-DVD, for example, 405 nm. The second light source 52 oscillates laser light having a wavelength of 650 nm corresponding to a DVD. Thus, when reproduction and recording is performed for the HD-DVD, the laser light emitted from the first light source 51 is used while, when reproduction and recording is performed for the DVD, the laser light emitted from the second light source 52 is used.

The DVD/HD-DVD compatible optical pickup device has a characteristic feature in that the device includes two light sources 51, 52 and one photodetector 70. The optical data of the objective lens 20 applied to the DVD/HD-DVD compatible optical pickup device is shown below in Table 7. Table 8 shows the amount of defocus and wave front chromatism according to the wavelength in use.

TABLE 7

| Focal Distance | Holographic Lens: 57.96 mm Aspherical Lens: 2.57 mm | | |
|---|---|---|---|
| Surface Number | Curvature | Thickness | Material |
| 1 | Infinity | 0.5 | BK7 |
| 2 | Infinity | 0.5 | |
| | Data of Holographic Lens | | |
| | C3:−8.5866E-3  C5: −8.5866E-2 | | |
| | C10: −5.6305E-4  C12: −1.1209E-3 | | |
| | C14: −5.6305E-4 | | |
| 3 | 1.661 | 1.78 | BACD5 |
| | Conic Constant (K): −1.0 | | |
| | Aspherical Coefficient: | | |
| | A: 0.14451E-1  B: 0.137369E-2 | | |
| | C: 0.75073E-4  D: −0.42792E-4 | | |
| | E: 0.20446E-4  F: −0.169476E-4 | | |
| 4 | −15.050 | 1.0 | |
| | Conic Constant (K): 0 | | |
| | Aspherical Coefficient: | | |
| | A: 0.195408E-1  B: −0.659928E-2 | | |
| | C: 0.183311E-2  D: 0.834946E-3 | | |
| 5 | Infinity | 0.6 | Disc |
| 6 | Infinity | 0.04 | |
| 7 | Infinity | 0.0 | |

TABLE 8

| Wavelength (nm) | 650 | 407 | 405 | 403 |
|---|---|---|---|---|
| Defocus ($\mu$m) | −15.52 | 0.42 | 0.12 | −0.19 |
| Wave Surface Chromatism ($\lambda$) | 0.01 | 0.006 | 0.0025 | 0.006 |

Figure 9:
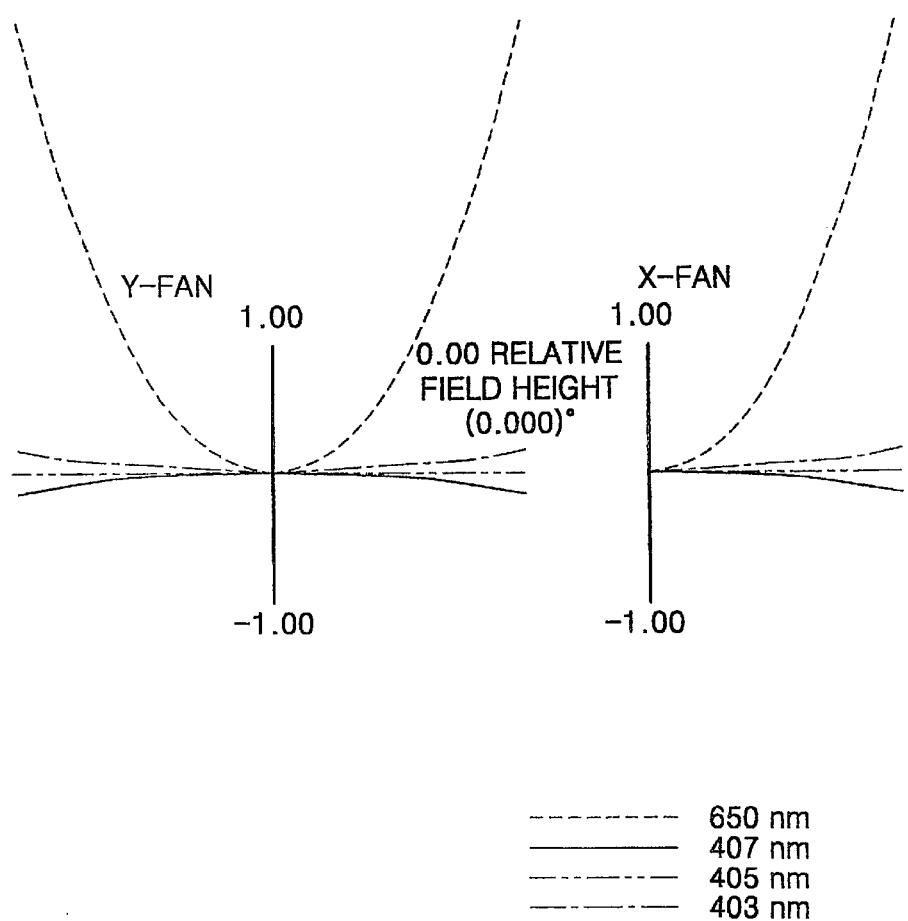
FIG. 9 is a graph showing the property of chromatism when the working distance between the objective lens according to the present invention and the disk is adjusted to be optimal for an HD-DVD.
Figure 10:
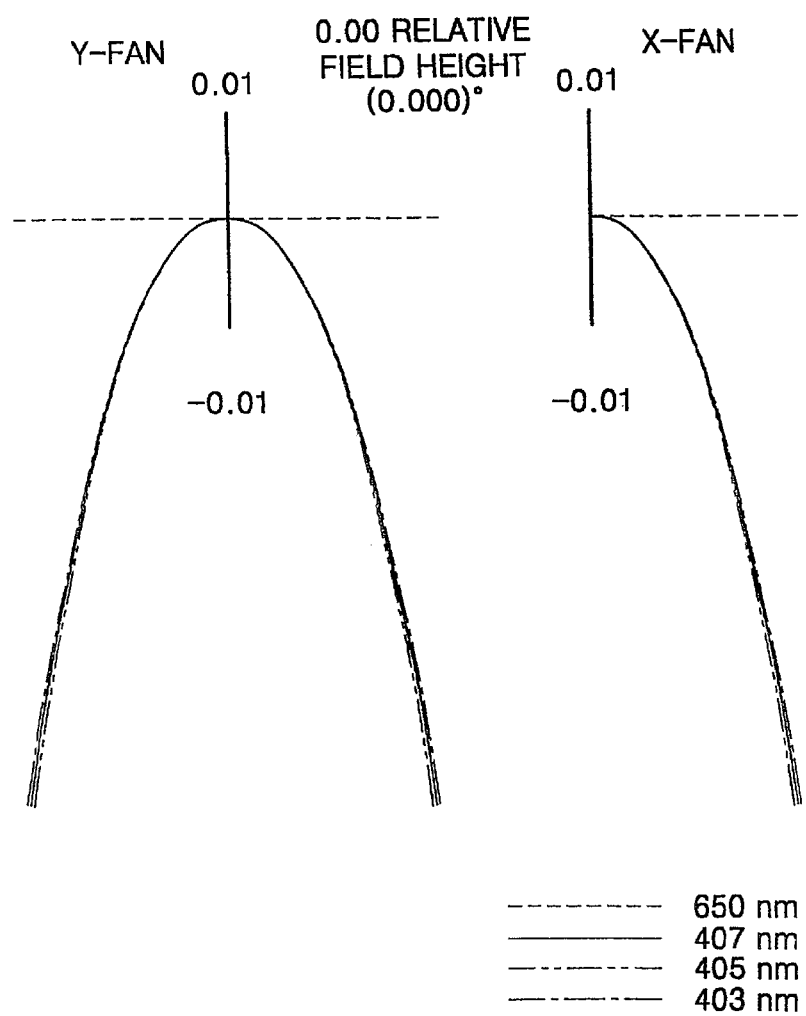
FIG. 10 is a graph showing the property of chromatism when the working distance between the objective lens according to the present invention and the disk is adjusted to be optimal for chromatism at a DVD.

When information of a DVD is reproduced by the DVD/HD-DVD compatible optical pickup device, the distance between the aspherical lens 21 of the objective lens 20 and the disk 10 is adjusted by a focus servo mechanism (not shown) such that the distance is 15 $\mu$m shorter than in the case of an HD-DVD. For a change of about ±2 nm in wavelength of laser light emitted from a light source 51 or 52 generated during the shift between reproduction and recording on the HD-DVD, reliable recording/reproduction is performed within the focal depth of the objective lens 20 without special adjustment. FIG. 9 shows the property of chromatism after the working distance between the objective lens 20 and a disk 10 is adjusted to be optimal for an HD-DVD. In the graph, it can be seen that the chromatism of a 405 nm HD-DVD is 0.01 $\lambda$ or less while the chromatism of a 650 nm DVD is very high. FIG. 10 shows the property of chromatism after the working distance is adjusted so that the chromatism of a DVD is optimal. In this case, the chromatism of HD-DVD is as much as 0.1 $\lambda$ or more. Thus, during use of an HD-DVD and recording/reproduction of a DVD, superior performance under 0.01 $\lambda$ for each case can be obtained by adjusting the working distance.

As described above, according to the present invention, during the shift between recording and reproduction of a DVD or an HD-DVD, the change in wavelength due to the change in power of the laser light and chromatism according to the change can be effectively corrected. Also, since the objective lens is formed of one aspherical lens and one holographic lens, the material for each of the lenses can be easily selected and also the structure of the optical pickup device adopting the objective lens according to the present invention can be simplified.

It is noted that the present invention is not limited to the preferred embodiment described above, and it is apparent that variations and modifications by those skilled in the art can be effected within the spirit and scope of the present invention defined in the appended claims.

What is claimed is:

1. An objective lens to focus light on a disk, comprising:
an aspherical lens facing the disk, said aspherical lens having a predetermined first focal distance and a predetermined numerical aperture; and
a holographic lens adjacent to said aspherical lens, said holographic lens having a second focal distance longer than the first focal distance and having a diffraction lattice that compensates for the chromatism due to a change in wavelength of laser light having a wavelength of 670 nm or less.

2. The objective lens as claimed in claim 1, wherein the disk is either a DVD or an HD-DVD.

3. The objective lens as claimed in claim 1, wherein said aspherical lens has a positive power, and said holographic lens has either a positive or a negative power.

4. The objective lens as claimed in claim 2, wherein said aspherical lens has a positive power, and said holographic lens has either a positive or a negative power.

5. An optical pickup device for recording and/or reproducing to/from a disk, comprising:
a light source to generate laser light which proceeds toward the disk;

an objective lens including an aspherical lens facing the disk and having a predetermined first focal distance and a predetermined numerical aperture, and a holographic lens adjacent to the aspherical lens and having a second focal distance longer than the first focal distance and having a diffraction lattice to compensate for the chromatism due to a change in wavelength of a laser light having a wavelength of 670 nm or less;

a beam splitter provided between said light source and said objective lens; and a photodetector that receives laser light reflected by the disk after passing through said beam splitter.

6. The device as claimed in claim 5, wherein the disk is either a DVD or an HD-DVD.

7. The device as claimed in claim 4, wherein said light source emits the laser light having a wavelength between and including 390 nm and 420 nm.

8. The device as claimed in claim 5, wherein said light source emits the laser light having a wavelength between and including 390 nm and 420 nm.

9. The device as claimed in claim 4, wherein the aspherical lens has a positive power and the holographic lens has either a positive or a negative power.

10. The device as claimed in claim 5, wherein the aspherical lens has a positive power and the holographic lens has either a positive or a negative power.

11. The device as claimed in claim 6, wherein the aspherical lens has a positive power and the holographic lens has either a positive or a negative power.

12. An optical pickup to record and/or reproduce to/from disks, comprising:

first and second light sources to generate respective first and second laser lights having different wavelengths which proceed toward a respective one of two different kinds of disks;

an objective lens including an aspherical lens facing the disk and having a predetermined first focal distance and a predetermined numerical aperture, and a holographic lens adjacent to the aspherical lens and having a second focal distance longer than that of the first focal distance and having a diffraction lattice to compensate for the chromatism due to a change in wavelength of laser light having a wavelength of 670 nm or less;

a first beam splitter between said first light source and said objective lens to transmit the first and second laser lights emitted from said first and second light sources to the one of the disks;

a second beam splitter between said first beam splitter and said first light source to reflect the second laser light emitted from said second light source to another of the disks; and a photodetector to receive the first and second laser lights reflected by either of the disks and said first beam splitter.

13. The optical pickup as claimed in claim 12, wherein the different kinds of disks are a DVD and an HD-DVD.

14. The optical pickup as claimed in claim 12, wherein said first light source emits a first laser light having a wavelength between and including 390 nm and 420 nm, and said second light source emits a second laser light having a wavelength between and including 630 nm and 670 nm.

15. The optical pickup as claimed in claim 13, wherein said first light source emits a first laser light having a wavelength between and including 390 nm and 420 nm, and said second light source emits a second laser light having a wavelength between and including 630 nm and 670 nm.

16. The optical pickup as claimed in claim 14, wherein said first light source emits a first laser light having a wavelength of 405 nm and said second light source emits a second laser light having a wavelength of 650 nm.

17. The optical pickup as claimed in claim 12, wherein the aspherical lens has positive power and the holographic lens has either a positive or a negative power.

18. The optical pickup as claimed in claim 13, wherein the aspherical lens has positive power and the holographic lens has either a positive or a negative power.

19. The optical pickup as claimed in claim 16, wherein the aspherical lens has positive power and the holographic lens has either a positive or a negative power.

20. The optical pickup as claimed in claim 14, wherein the aspherical lens has positive power and the holographic lens has either a positive or a negative power.

21. An objective lens to focus light on a disk, comprising:
a holographic lens; and
an aspherical lens between said holographic lens and the disk, said aspherical lens being at a fixed position relative to the disk so as to compensate for the chromatism due to a change in wavelength of the laser light having a wavelength of 670 nm or less.

22. The objective lens as claimed in claim 21, wherein said holographic lens and said aspherical lens compensates for the chromatism so as to produce a wave surface chromatism of less than $0.1\lambda$.

23. The objective lens as claimed in claim 21, wherein said aspherical lens comprises a predetermined first focal distance, and said holographic lens comprises a second focal distance longer than the first focal distance.

24. The objective lens as claimed in claim 21, wherein said aspherical lens has a positive power, and said holographic lens has a positive power.

25. The objective lens as claimed in claim 21, wherein said aspherical lens has a positive power, and said holographic lens has a negative power.

26. The objective lens as claimed in claim 21, wherein the change in wavelength is ±2 nm.

27. An optical pickup to record and/or reproduce to/from a disk, comprising:
a light source to generate laser light which proceeds toward the disk;
an objective lens comprising a holographic lens, and an aspherical lens between the holographic lens and the disk, the aspherical lens being at a fixed position relative to the disk so as to compensate for the chromatism due to a change in wavelength of the laser light having a wavelength of 670 nm or less; and
a photodetector that receives laser light reflected by the disk.

28. The optical pickup as claimed in claim 27, wherein said objective lens compensates for the chromatism so as to produce a wave surface chromatism of less than $0.1\lambda$.

29. The optical pickup as claimed in claim 27, wherein the aspherical lens comprises a predetermined first focal distance, and the holographic lens comprises a second focal distance longer than the first focal distance.

30. The optical pickup as claimed in claim 27, wherein the aspherical lens has a positive power, and the holographic lens has a positive power.

31. The optical pickup as claimed in claim 27, wherein the aspherical lens has a positive power, and the holographic lens has a negative power.

32. The optical pickup as claimed in claim 27, wherein the change in wavelength is ±2 nm.

33. An optical pickup to record and/or reproduce to/from disks, comprising:
light sources to generate laser lights having different wavelengths which proceed toward respective ones of the disks, depending upon which one of the disks is to be accessed;

an objective lens comprising a holographic lens, and an aspherical lens between the holographic lens and the disk to be accessed, the aspherical lens being at fixed positions relative to the disk to be accessed so as to compensate for the chromatism due to a change in wavelength of the laser lights having a wavelength of 670 nm or less; and a photodetector to receive the laser light reflected by the disk to be accessed.

34. The optical pickup as claimed in claim 33, further comprising an optical adjusting unit to move the aspherical lens between the fixed positions based upon the wavelength of the generated laser light.

35. The optical pickup as claimed in claim 33, wherein said objective lens compensates for the chromatism so as to produce a wave surface chromatism of less than $0.1\lambda$.

36. The optical pickup as claimed in claim 33, wherein the aspherical lens comprises a predetermined first focal distance, and the holographic lens comprises a second focal distance longer than the first focal distance.

37. The optical pickup as claimed in claim 33, wherein the aspherical lens has a positive power, and the holographic lens has a positive power.

38. The optical pickup as claimed in claim 33, wherein the aspherical lens has a positive power, and the holographic lens has a negative power.

39. The optical pickup as claimed in claim 33, wherein the change in wavelength is ±2 nm.

* * * * *